(12) United States Patent
Okazaki

(10) Patent No.: US 7,896,324 B2
(45) Date of Patent: Mar. 1, 2011

(54) TRANSFER CAR HAVING LIFTING AND LOWERING FUNCTION AND TURNING FUNCTION AND AUTOMOBILE ASSEMBLY LINE USING THE SAME

(75) Inventor: Yoshihiro Okazaki, Osaka (JP)

(73) Assignee: Nakanishi Metal Works Co., Ltd., Osaka-shi (JP)

( * ) Notice: Subject to any disclaimer, the term of this patent is extended or adjusted under 35 U.S.C. 154(b) by 424 days.

(21) Appl. No.: 12/164,569

(22) Filed: Jun. 30, 2008

(65) Prior Publication Data

US 2009/0010746 A1 Jan. 8, 2009

(30) Foreign Application Priority Data

Jul. 2, 2007 (JP) .............................. 2007-174348

(51) Int. Cl.
*B23Q 3/00* (2006.01)

(52) U.S. Cl. .................. 269/17; 269/289 R; 269/50; 29/281.1

(58) Field of Classification Search ............... 269/17, 269/289 R, 50; 254/89 H, 90, 93 H; 29/281.1, 29/281.4, 281.5, 799, 822, 823, 824; 414/459–461, 414/590; 212/318
See application file for complete search history.

(56) References Cited

U.S. PATENT DOCUMENTS

| | | | | |
|---|---|---|---|---|
| 2,499,442 A * | 3/1950 | Wright | ................... | 414/543 |
| 2,583,714 A * | 1/1952 | Smith | ................... | 269/17 |
| 2,598,201 A * | 5/1952 | Williams et al. | ............ | 118/304 |
| 3,030,103 A * | 4/1962 | Allen et al. | ................... | 269/17 |
| 3,887,080 A * | 6/1975 | Wilson | ................... | 212/318 |
| 4,278,244 A * | 7/1981 | Carter | ................... | 269/17 |
| 4,307,877 A * | 12/1981 | Rogos | ................... | 269/46 |
| 4,609,093 A * | 9/1986 | Taketani et al. | ............. | 198/378 |
| 4,734,979 A * | 4/1988 | Sakamoto et al. | ............. | 29/822 |
| 4,776,085 A * | 10/1988 | Shiiba | ................... | 29/824 |
| 4,897,011 A * | 1/1990 | Brower | ................... | 414/459 |
| 5,009,406 A * | 4/1991 | McDermott | ................... | 269/17 |
| 5,362,196 A * | 11/1994 | Beattie et al. | ............... | 414/785 |
| 5,383,653 A * | 1/1995 | Stuck | ................... | 269/17 |
| 6,003,830 A * | 12/1999 | Egan | ................... | 248/676 |
| 6,292,998 B1 * | 9/2001 | Wiemers | ................... | 29/559 |
| 6,685,170 B1 * | 2/2004 | Gwynn | ................... | 254/325 |
| 6,860,800 B1 * | 3/2005 | Maurer | ................... | 451/364 |
| 2004/0150148 A1 * | 8/2004 | Luca et al. | ................... | 269/17 |
| 2005/0212191 A1 * | 9/2005 | McKelvie et al. | ............. | 269/17 |

FOREIGN PATENT DOCUMENTS

JP 57-123315 7/1982
JP 62-168769 7/1987

* cited by examiner

*Primary Examiner*—George Nguyen
(74) *Attorney, Agent, or Firm*—Kratz, Quintos & Hanson, LLP

(57) ABSTRACT

The transfer car 1 includes: a pair of guide posts 3, 4 erected on diagonal corner portions of a base 2 formed nearly in a rectangular shape when viewed in a plan; a pair of lifting and lowering support bodies 5, 6 supported by these guide posts 3, 4 and lifted and lowered; a lateral bridging member 7 laterally bridging the pair of lifting and lowering support bodies 5, 6; a turn table 8 mounted on a lower side in a center in a longitudinal direction of the lateral bridging member 7 and having a turning part 8B turned around a vertical axis 8C with respect to a fixed portion 8A; and a hanger 9 having a top end portion coupled to the turning part 8B of the turn table 8 and hanging a vehicle body A placed on receiving parts 9B, 9B mounted on a bottom end portion.

4 Claims, 6 Drawing Sheets

(a)

(b)

TRANSFER CAR HAVING LIFTING AND LOWERING FUNCTION AND TURNING FUNCTION AND AUTOMOBILE ASSEMBLY LINE USING THE SAME

BACKGROUND OF THE INVENTION

1. Field of the Invention

The present invention relates to a transfer car that can lift and lower a vehicle body and can turn the vehicle body around a vertical axis, that is, has a lifting and lowering function and a turning function, and an automobile assembly line using the transfer car having a lifting and lowering function and a turning function.

2. Description of the Background Art

Vehicle bodies are generally transferred in a state where the vehicle bodies are hung by an overhead conveyor in a chassis process for mounting a chassis and an engine on a vehicle body in an automobile assembly line of a fitting factory and between the respective processes in the line (for example, see patent document 1).

Moreover, in the automobile assembly line, the vehicle bodies are generally transferred in a state where the vehicle bodies are placed on a transfer car conveyor in a trim process for mounting interior parts on the vehicle body and in a final process for mounting exterior parts on the vehicle body, and in these processes are used transfer cars that can lift and lower the vehicle body to a height suitable for the operation of mounting the parts, that is, has a lifting and lowering function (for example, see patent document 2).

Here, in these processes have been also used transfer cars that has a steering mechanism for steering wheels, which are mounted on a lower portion of the base of a transfer car having a lifting and lowering function in such a way as to be steered and can be rolled on a travel road, and that additionally has a turning function for changing the orientation of the vehicle body, in other words, transfer cars that has a lifting and lowering function and a turning function (for example, see patent document 2).

Patent document 1: Japanese Unexamined Utility Model Publication No. Sho 57-123315 (FIGS. 1 and 2)

Patent document 2: Japanese Unexamined Patent Publication No. Sho 62-168769 (FIGS. 1 to 4)

In the overhead conveyor hung from the building as described in the patent document 1, travel rails need to be installed above the heads of operators (for example, near the ceiling of the factory) and a high-elevation operation using heavy equipment are required to install the travel rails. Thus, extra caution must be taken for safety and a large number of man-hours are required to install auxiliary beams, hangers, safety nets, inspection corridors and ladders, and the like in the field. In addition, to hang the overhead conveyor and auxiliary equipment from the building, the building is required to have strength meeting a hung load and hence the construction cost of the building is increased so as to increase the strength of the building.

Moreover, the transfer car having a lifting and lowering function as described in the patent document 2 does not present the problem of increasing the installation cost of the overhead conveyor and the construction cost as described in the patent document 1, but a pair of right and left guide posts erected on the base are near the vehicle body and hence interfere with the operation of mounting parts on the under floor of the vehicle body.

Further, the transfer car having a turning function as described in the patent document 2 is constructed in such a way that the wheels mounted on the lower side of the transfer car are steered by the steering mechanism driven with an air cylinder to thereby turn the entire transfer car. Thus, the vehicle body (transfer car) cannot be turned when the front and rear transfer cars are not separated from the transfer car by a specified distance or more (for example, the vehicle body cannot be turned in a state where the front and rear transfer cars are adjacent to the transfer car), nor the vehicle body can be relatively turned with respect to the operator so as to facilitate the operation of the operator operating on the base or to eliminate the useless operation of the operator.

Still further, the transfer car traveling on a transfer path is mounted with air cylinders of actuators for the steering mechanism for steering the respective wheels, so that these air cylinders need to be supplied with air from the outside of the transfer car.

Still further, in the conventional automobile assembly line, the vehicle bodies in the chassis process for mounting parts on the under floor of the vehicle body are transferred by the overhead conveyor, and the vehicle bodies in the trim process for mounting interior parts on the vehicle body and in the final process for mounting exterior parts on the vehicle body are transferred in a state where the vehicle bodies are placed on a transfer car conveyor. In this manner, the overhead conveyor and the transfer car conveyor are mixedly installed, so that as described above, the installation of the overhead conveyor increases installation cost and construction cost and the guide posts for the transfer cars having a lifting and lowering function interfere with the operation of mounting parts on the under floor of the vehicle body.

Still further, as described above, even when the transfer cars additionally provided with the turning function are used, there is a limit to turning the vehicle body, which cannot always improve workability and reduces the degree of flexibility of the automobile assembly line to be constructed by the use of the transfer cars.

In addition, there is no commonality of transfer equipment and the overhead conveyor and the transfer car conveyor are mixedly installed, which increases the number of necessary transfer units. This increases cost by that much and decreases availability and increases the number of vehicle bodies in process.

Thus, what the present invention is going to solve in view of the above-mentioned circumstances is to provide a transfer car that has a lifting and lowering function and a turning function and that has high workability and a high degree of flexibility in constructing a line, and an automobile assembly line that uses the transfer car having a lifting and lowering function and a turning function and that can reduce cost, shorten a construction time, increase availability, and reduce the number of vehicle bodies in process.

SUMMARY OF THE INVENTION

In order to solve the above-mentioned problem, a transfer car having a lifting and lowering function and a turning function according to the present invention includes: a pair of guide posts erected on a front right end portion and a rear left end portion, or on a front left end portion and a rear right end portion of a base formed nearly in a rectangular shape when viewed in a plan; a pair of lifting and lowering support bodies supported by these guide posts and lifted and lowered; a lateral bridging member laterally bridging the pair of lifting and lowering support bodies; a turn table mounted on a lower side in a center in a longitudinal direction of the lateral bridging member and having a turning part turned around a vertical axis with respect to a fixed part; and a hanger having a top end portion coupled to the turning part of the turn table and hanging a vehicle body placed on a receiving part mounted on a bottom end portion.

Here, it is preferable that each of the pair of lifting and lowering support bodies is coupled and fixed to a nut of a ball screw and is lifted and lowered by turning a ball screw shaft engaged with the nut via a transmission mechanism mounted on the base by an external drive unit mounted at a specified position of a transfer path to lift and lower the lateral bridging member, the turn table, and the hanger, and that the turn table is turned by a manual operation or by operating a cam link coupled and fixed to the turning part by an external guide rail mounted at a specified position of the transfer path.

Moreover, in order to solve the above-mentioned problem, an automobile assembly line using the transfer car having a lifting and lowering function and a turning function according to the present invention is an automobile assembly line using the transfer car having a lifting and lowering function and a turning function in common in respective processes, wherein the transfer car is transferred in the respective processes by at least either of an automated guided vehicle that sinks under the base and tows the transfer car, or a friction roller type drive unit that presses a friction roller onto the side surface of the base to apply a propelling force, and wherein the transfer car is transferred between the respective processes by the automated guided vehicle.

The transfer car having a lifting and lowering function and a turning function according to the present invention includes: a pair of guide posts erected on a front right end portion and a rear left end portion, or on a front left end portion and a rear right end portion of a base formed nearly in a rectangular shape when viewed in a plan; a pair of lifting and lowering support bodies supported by these guide posts and lifted and lowered; a lateral bridging member laterally bridging the pair of lifting and lowering support bodies; a turn table mounted on a lower side in a center in a longitudinal direction of the lateral bridging member and having a turning part turned around a vertical axis with respect to a fixed part; and a hanger having a top end portion coupled to the turning part of the turn table and hanging a vehicle body placed on a receiving part mounted on a bottom end portion, so that the transfer car having a lifting and lowering function and a turning function according to the present invention can reduce installation cost and construction cost as compared with the overhead conveyor hung from the house.

Moreover, a pair of guide posts are disposed on a front right end portion and a rear left end portion, or on a front left end portion and a rear right end portion of a base formed nearly in a rectangular shape when viewed in a plan (on the diagonal corner portions of the base formed nearly in a rectangular shape when viewed in a plan), so that these guide posts do not interfere with the operation of mounting parts on the under floor of the vehicle body.

Further, the vehicle body can be turned with respect to the base by the turn table, so that the vehicle body can be turned irrespective of position relation to the other transfer car, for example, even in a state where the transfer car is adjacent to the transfer car on front or rear side thereof.

Thus, the vehicle body can be turned according to the contents of the operation at an arbitrary position of a transfer path (operational process) so as to facilitate the operation of the operator operating on the base or to eliminate the useless action of the operator, so that workability can be enhanced.

Further, when the vehicle body is delivered to or received from a transfer unit, the vehicle body can be turned in accordance with the direction in which the transfer unit is extended and contracted, so that the operation of delivering or receiving the vehicle body can be easily performed. Moreover, the vehicle body can be also turned in accordance with a sub-conveyor for transferring parts, so that the degree of flexibility in constructing a line can be enhanced.

Still further, each of the pair of lifting and lowering support bodies is coupled and fixed to a nut of a ball screw and is lifted and lowered by turning a ball screw shaft engaged with the nut via a transmission mechanism mounted on the base by an external drive unit mounted at a specified position of a transfer path to lift and lower the lateral bridging member, the turn table, and the hanger, and the turn table is turned by a manual operation or by operating a cam link coupled and fixed to the turning part by an external guide rail mounted at a specified position of the transfer path, so that in addition to the above-mentioned effects, the transfer car is not mounted with an actuator such as a motor or an air cylinder and hence a traveling transfer car does not need to be supplied with power. Hence, the transfer car and an automobile assembly line using the transfer car can be made simple.

An automobile assembly line using the transfer car having a lifting and lowering function and a turning function according to the present invention is an automobile assembly line using the transfer car having a lifting and lowering function and a turning function in common in respective processes, and the transfer car is transferred in the respective processes by at least either of an automated guided vehicle that sinks under the base and tows the transfer car, or a friction roller type drive unit that presses a friction roller onto a side surface of the base to apply a propelling force, and the transfer car is transferred between the respective processes by the automated guided vehicle. In other words, the automobile assembly line according to the present invention is an automobile assembly line including plural transfer cars having a lifting and lowering function and a turning function, so that the automobile assembly line according to the present invention includes the effect produced by the transfer car having a lifting and lowering function and a turning function.

Hence, only the transfer cars used in common are installed and the overhead conveyor is not installed, so that installation cost and construction cost can be reduced.

Still further, a pair of guide posts of the transfer car used in common are disposed on a front right end portion and a rear left end portion, or on a front left end portion and a rear right end portion of a base formed nearly in a rectangular shape when viewed in a plan (on the diagonal corner portions of the base formed nearly in a rectangular shape when viewed in a plan), so that these guide posts do not interfere with the operation of mounting parts on the under floor of the vehicle body.

Still further, the vehicle body can be turned with respect to the base by the turn table, so that the vehicle body can be turned irrespective of position relation to the other transfer car, for example, even in a state where the transfer car is adjacent to the transfer car on the front or rear side thereof.

Thus, the vehicle body can be turned according to the contents of the operation at an arbitrary position of a transfer path (operational process) so as to facilitate the operation of the operator operating on the base or to eliminate the useless action of the operator. Hence, workability can be enhanced.

Still further, when the vehicle body is delivered to or received from the transfer unit, the vehicle body can be turned in accordance with the direction in which the transfer unit is extended and contracted, so that the operation of delivering or receiving the vehicle body can be easily performed. Moreover, the vehicle body can be turned in accordance with a sub-conveyor for transferring parts, so that the degree of flexibility in constructing a line can be enhanced.

Still further, the transfer car is not mounted with an actuator such as a motor or an air cylinder and hence the traveling transfer car does not need to be supplied with power. Hence, the automobile assembly line can be made simple.

Still further, the transfer cars can be used in common in the automobile assembly line, so that cost can be reduced and construction time can be shortened.

Still further, the transfer cars are used in common, and the transfer cars are transferred in the respective processes by at least either of an automated guided vehicle that sinks under the base and tows the transfer car, or a friction roller type drive unit that presses a friction roller onto the side surface of the base to apply a propelling force, and transfer car is transferred between the respective processes by the automated guide vehicle. Thus, when the respective lines are connected in series like a line to construct the automobile assembly line, the necessary transfer units can be reduced in number. Hence, since the transfer units can be reduced in number, the availability of the line can be enhanced and the number of vehicle bodies in process can be reduced.

In further more addition, since the transfer cars are transferred by only the sinking type automated guided vehicle or by a combined use of the sinking type automated guided vehicle and the friction roller type drive unit, chains and the like do not need to be installed under the transfer cars and hence the level of a floor can be lowered. Hence, it is possible to construct an automobile assembly line that is simple, effective, and excellent in workability because the operator can easily ride on and off the floor owing to the low floor.

BRIEF DESCRIPTION OF THE DRAWINGS

FIG. 5A shows a state where the hanger supporting a vehicle body is lowered to the lowest position, and FIG. 5B shows a state where the hanger supporting a vehicle body is lowered to the lowest position and where the vehicle body is turned 90 degrees around a vertical axis.

FIG. 6A shows a state where the hanger supporting a vehicle body is lifted to the highest position, and FIG. 6B shows a state where the hanger supporting a vehicle body is lifted to the highest position and where the vehicle body is turned 90 degrees around the vertical axis.

DESCRIPTION OF THE PREFERRED EMBODIMENTS

Figure 1:
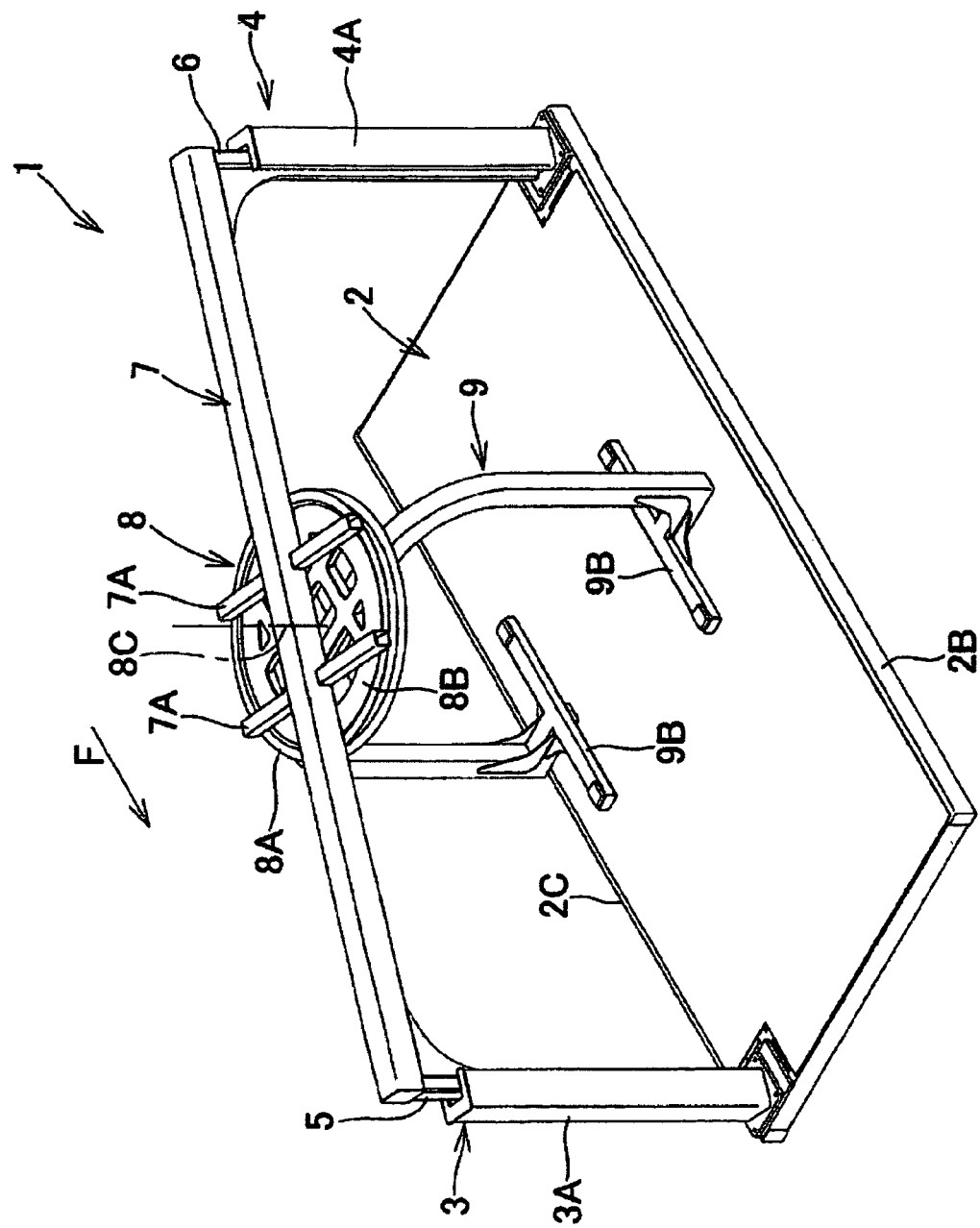
FIG. 1 is a perspective view, when viewed from above left, of a transfer car having a lifting and lowering function and a turning function according to an embodiment of the present invention and shows a state where a hanger is lowered to the lowest position.

Next, embodiments of the present invention will be described in detail with reference to the accompanying drawings. The present invention is not limited to the embodiments shown by the accompanying drawings but includes all embodiments satisfying the requirements as described in claims. Here, in this specification, the direction in which a transfer car 1 is transferred (see arrow F in the drawings) is assumed to be a front side and right and left sides are assumed to be right and left sides when facing the front side. Moreover, a hanger 9 can turn around a vertical axis 8C, and as shown in FIG. 1 to FIG. 4 and FIG. 5A and FIG. 6A, the hanger 9 is formed nearly in the shape of an inverted letter U when viewed from the front and rear direction. The right and left sides of the hanger 9 are assumed to be right and left sides with reference to a state where a vehicle body A is directed forward. Moreover, a view when the transfer car 1 (base 2) is viewed from the left side is assumed to be a front view.

Figure 2:
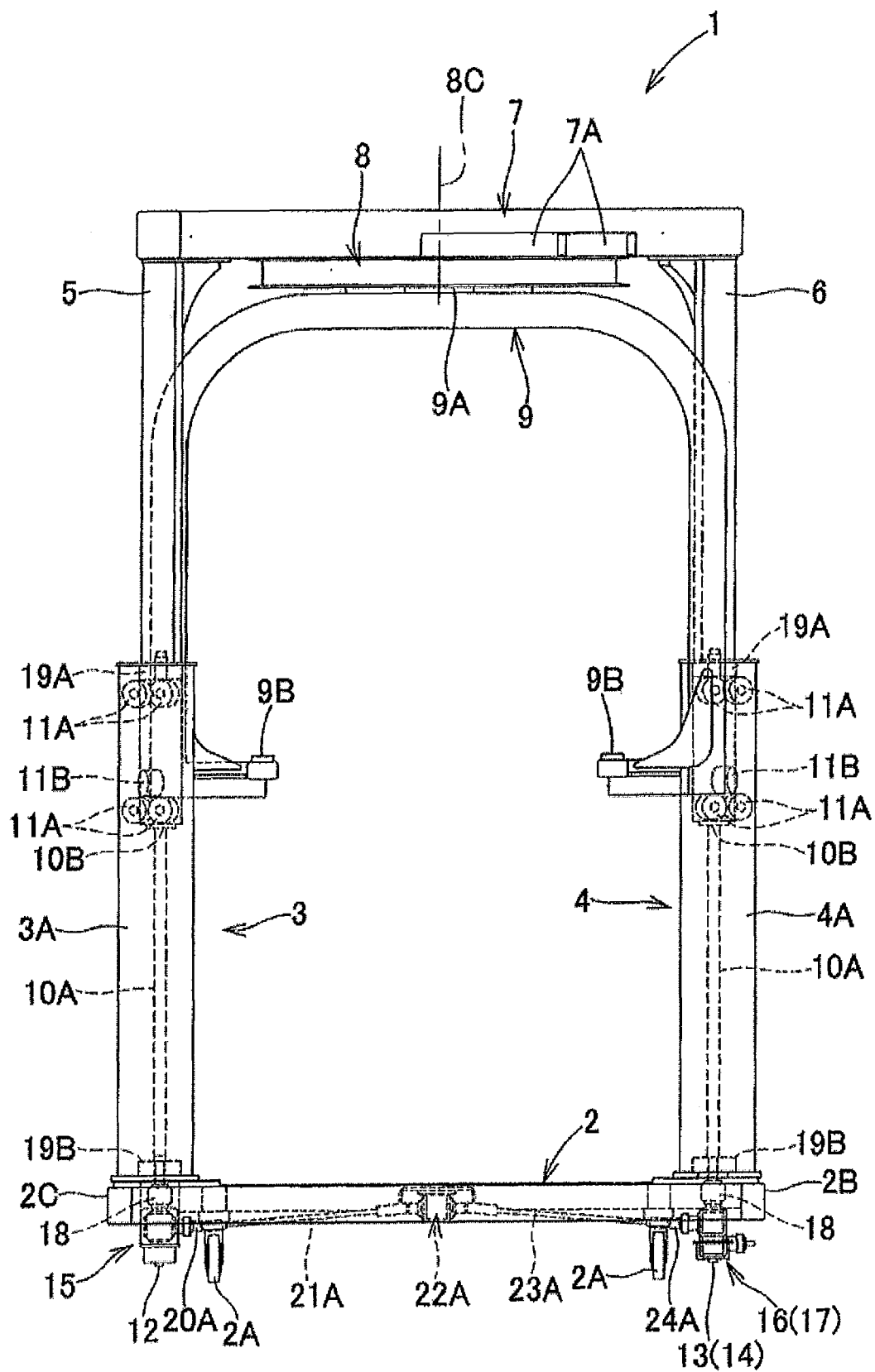
FIG. 2 is a view, when viewed from the front, of the transfer car and shows a state where the hanger is lifted to the highest position.
Figure 3:
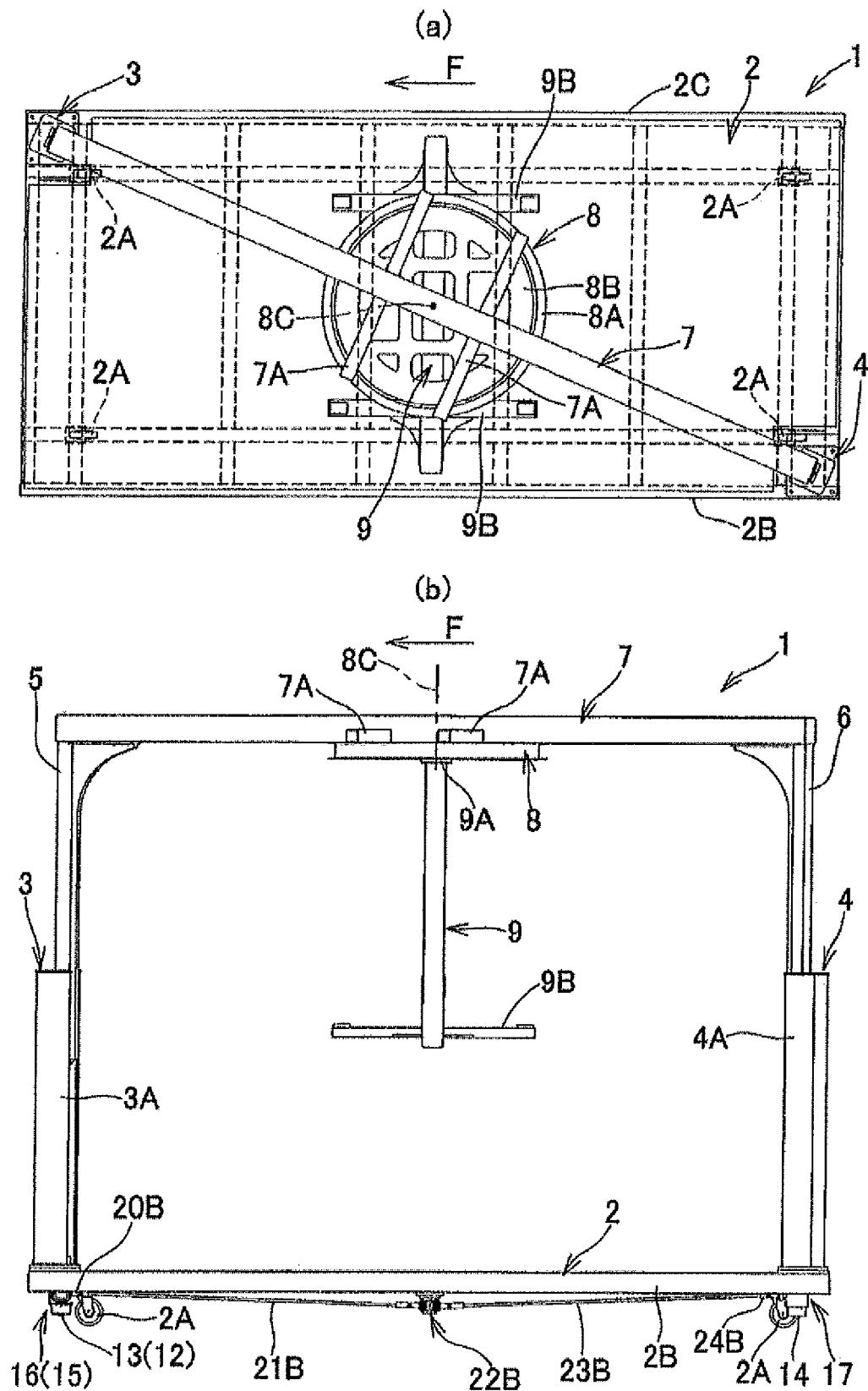
FIG. 3A is a plan view of the transfer car.
FIG. 3B is a front view of the transfer car and shows a state where the hanger is lifted to the highest position.
Figure 4:
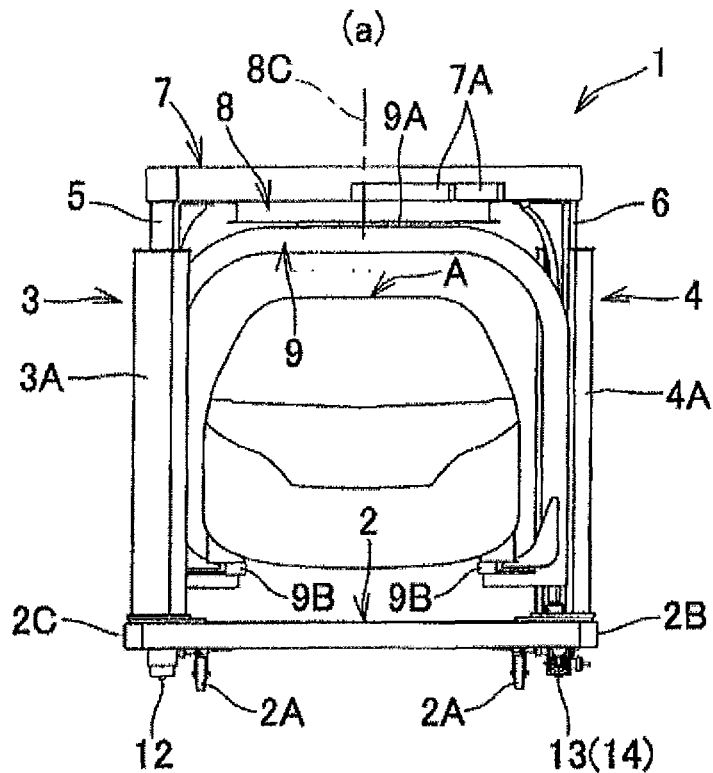
FIG. 4A is a view, when viewed from the front, of the transfer car.
FIG. 4B is a front view of the transfer car and shows a state where the hanger supporting a vehicle body is lowered to the lowest position.
Figure 4:
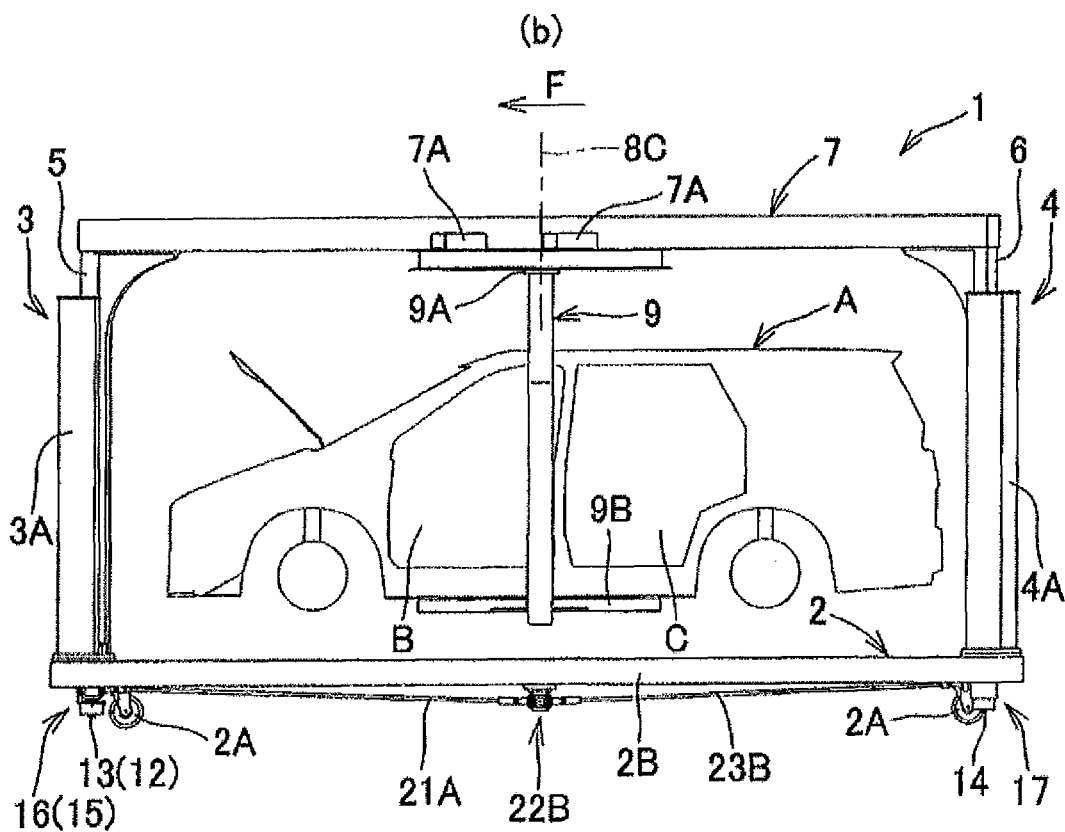
Figure 5:
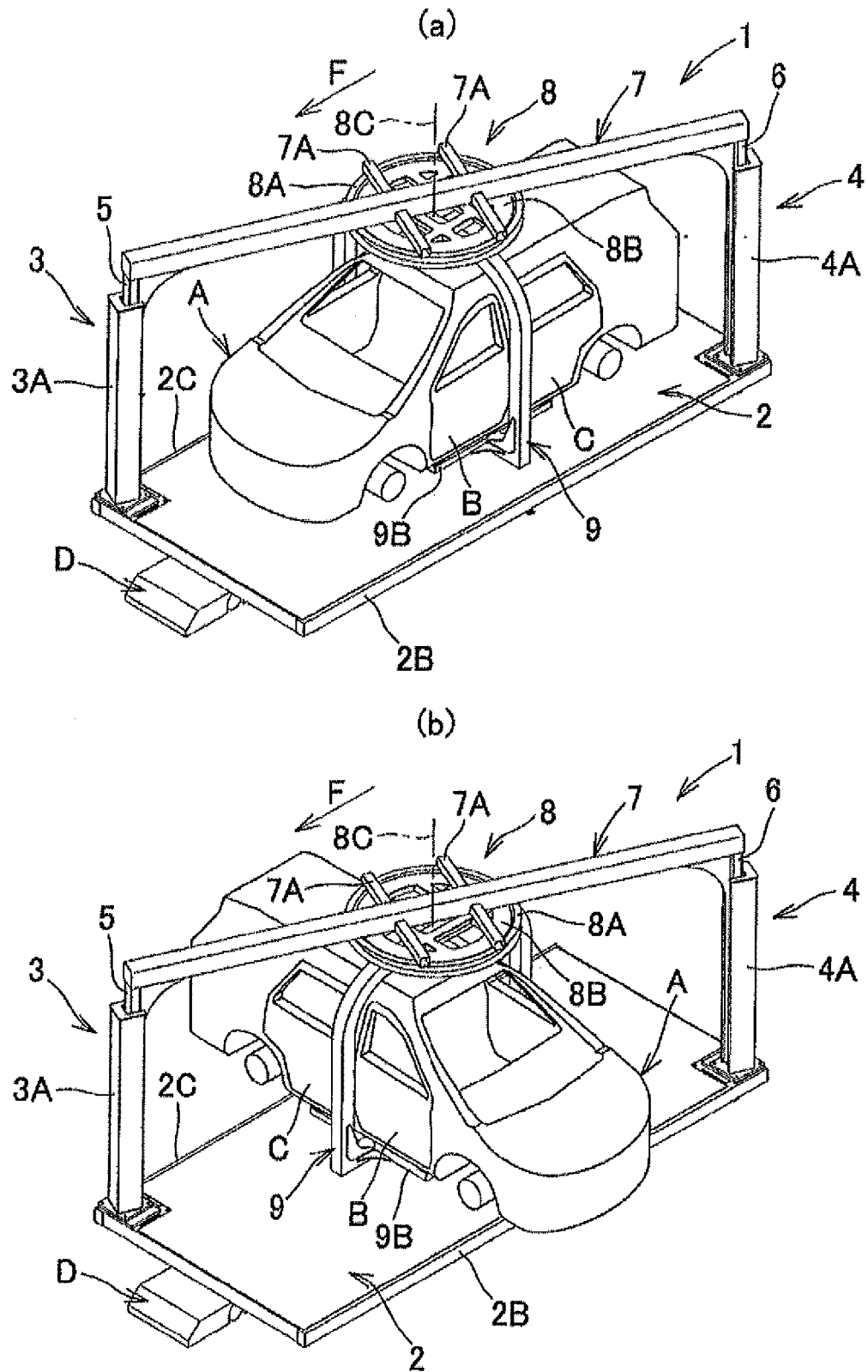
FIGS. 5A and 5B are perspective views, when viewed from above left, of the transfer car.
Figure 6:
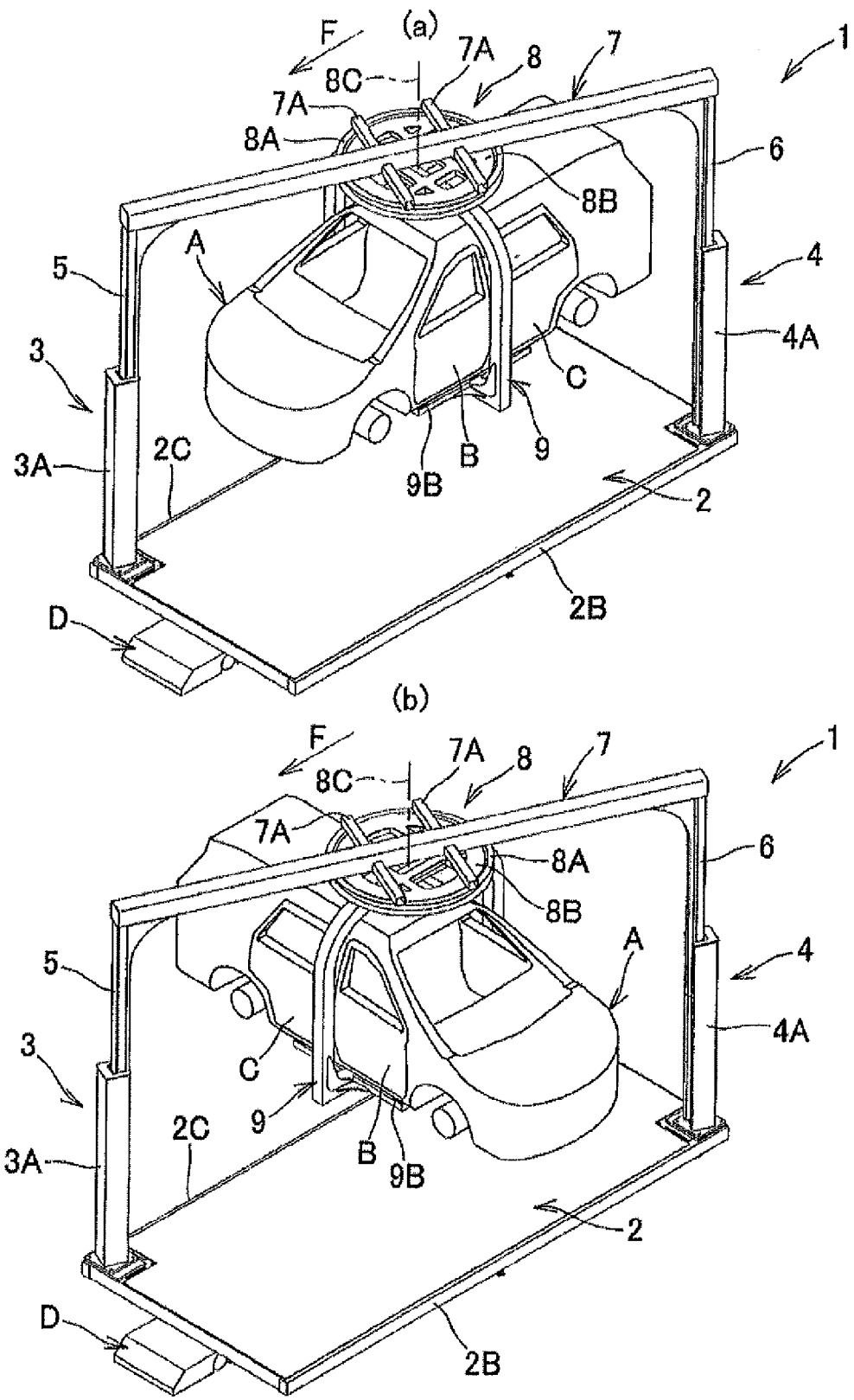
FIGS. 6A and 6B are perspective views, when viewed from above left, of the transfer car.

FIG. 1 to FIG. 6 are schematic views showing the construction of the transfer car 1 having a lifting and lowering function and a turning function according to an embodiment of the present invention. FIG. 1 is a perspective view, when viewed from the above left, of the transfer car 1 and shows a state where the hanger 9 is lowered to the lowest position. FIG. 2 is a view, when viewed from the front, of the transfer car 1 and shows a state where the hanger 9 is lifted to the highest position. FIG. 3A is a plan view of the transfer car 1, and FIG. 3B is a front view of the transfer car 1 and shows a state where the hanger 9 is lifted to the highest position. FIG. 4A is a view, when viewed from the front, of the transfer car 1 and shows a state where the hanger 9 supporting a vehicle body A is lowered to the lowest position, and FIG. 4B is a front view of the transfer car 1. FIG. 5 is a perspective view, when viewed from the above left, of the transfer car 1. FIG. 6 is a perspective view, when viewed from the above left, of the transfer car 1 and shows a state where the hanger 9 supporting the vehicle body A is lifted to the highest position. FIG. 5B and FIG. 6B show a state where the vehicle body A is turned 90 degrees around the vertical axis 8C.

In this regard, in FIG. 5 and FIG. 6 is shown a state where doors B, C are mounted on the front and rear and right and left sides of the vehicle body A and where these doors B, C are closed. However, when the transfer car 1 having a lifting and lowering function and a turning function of the present invention is used, for example, in a trim process, the operation of mounting interior parts on the vehicle body A is performed in a state where the doors B, C are fully opened.

Moreover, the doors B, C may be dismounted after a coating process and may be mounted in the final process, and the transfer car 1 having a lifting and lowering function and a turning function of the present invention may be used in a door-less line in which the vehicle body is in a door-less state in the trim process and in the chassis process.

As shown in FIG. 1 to FIG. 4, the transfer car 1 having a lifting and lowering function and a turning function can travel on rails or on a floor by the front and rear and right and left travel wheels 2A, . . . mounted on the under surface of the base 2. The transfer car 1 is transferred by the traction of an automated guided vehicle D, which sinks under the base 2 and can travel by itself as shown in FIG. 5 and FIG. 6, or by a propelling force applied by pressing the friction rollers of a friction roller type drive unit (not shown) onto the side surfaces 2B, 2C of the base 2.

Moreover, the transfer car 1 having a lifting and lowering function and a turning function is provided with: a pair of guide posts 3, 4 erected on diagonal corner portions of the base 2 formed nearly in a rectangular shape when viewed in plan view, that is, on the front right end portion and the rear left end portion (which may be the front left end portion and the rear right end portion) of the base 2; a pair of lifting and lowering support bodies 5, 6 that are supported by the guide posts 3, 4 and are lifted and lowered; a lateral bridging member 7 laterally bridging the pair of lifting and lowering support bodies 5, 6; a turn table 8 that is mounted on the central lower portion in the longitudinal direction of the lateral bridging member 7 by support bars 7A, 7A and that has a turning part 8B supported by a bearing such as a cross roller bearing (not shown) and turned around the vertical axis 8C with respect to a fixed part 8A; and the hanger 9 that has a top end portion connected to the turning part 8B of the turntable 8 by connection plates 9A, 9A and that has the vehicle body A (see FIG. 4 to FIG. 6) placed on receiving parts 9B, 9B mounted on a bottom end portion and that hangs the vehicle body A in such a way as to hold the vehicle body A.

In the transfer car 1, the pair of guide posts 3, 4 are disposed on the diagonal corner portions of the base 2 formed nearly in a rectangular shape when viewed in the plan view, so that as shown in FIG. 6, when the vehicle body A is lifted and parts are mounted on its under floor, the guide posts 3, 4 do not interfere with the operation of mounting the parts and as shown in FIG. 5 and FIG. 6, also when the vehicle body A is turned, the guide posts 3, 4 do not interfere with the operation of turning the vehicle body A.

Next, a construction example of a lifting and lowering unit for lifting and lowering the lifting and lowering support bodies 5, 6 along the guide posts 3,4 will be described.

As shown in FIG. 2, rollers 11A, 11B that are mounted on the lifting and lowering support bodies 5, 6 and that can be turned around a horizontal axis are guided by frames 3A, 4A forming the guide rails of the guide posts 3, 4, so that the lifting and lowering support bodies 5, 6 are supported by the guide posts 3, 4 so as to be lifted and lowered.

Moreover, ball screw shafts 10A, 10A that have top and bottom end portions supported by top and bottom bearings 19A, 19B and that can be turned around a vertical axis are received in the guide posts 3, 4, respectively. Nuts 10B, 10B engaged with the ball screw shafts 10A, 10A are fixed to the bottom end portions of the lifting and lowering support bodies 5, 6, so that when the ball screw shafts 10A, 10A are turned, the lifting and lowering support bodies 5, 6 are lifted and lowered.

Driven shafts 12, 14, which are directed downward and drive the ball screw shafts 10A, 10A, are disposed just below the guide posts 3, 4, that is, on the undersides of the front right end portion and the rear left end portion of the base 2. The driven shafts 12, 14 are coupled to the bottom ends of the ball screw shafts 10A, 10A via bevel gears and couplings 18, 18 in gear boxes 15, 17.

Moreover, a driven shaft 13, which is directed downward and drives the ball screw shafts 10A, 10A, and a gear box 16 are disposed also on the underside of the front left end portion of the base 2.

Here, power is transmitted between the gear boxes 15 and 16, as shown in FIG. 2, from the bevel gear in the gear box 15 on the front right end portion of the base 2 to the bevel gear in the gear box 16 on the front left end portion via a coupling 20A, a right transmission shaft 21A, a coupling 22A in the center in the right and left direction, a left transmission shaft 23A, and a coupling 24A, whereas power is transmitted between the gear boxes 16 and 17, as shown in FIG. 3B, from the bevel gear in the gear box 16 on the front left end portion of the base 2 to the bevel gear in the gear box 17 on the rear left end portion via a coupling 20B, a front transmission shaft 21B, a coupling 22B in the center in the front and rear direction, a rear transmission shaft 23B, and a coupling 24B.

Thus, when any one of driven shafts 12, 13, 14 on the undersides of the front right end portion, the front left end portion, and the rear left end portion of the base 2 is driven, the ball screw shafts 10A, 10A in the right and left guide posts 3, 4 are synchronously turned in association.

Hence, when a drive unit (not shown) is disposed on the underside of any one of the driven shafts 12, 13, 14 at positions where the height of the vehicle body A needs to be changed according to the operations in the respective processes of the automobile assembly line and the any one of the driven shafts 12, 13, 14 is turned, the ball screw shafts 10A, 10A are synchronously turned to thereby lift and lower the lifting and lowering support bodies 5, 6.

As described above, when the lifting and lowering support bodies 5, 6 are coupled and fixed to the nuts 10B, 10B of ball screws and the ball screw shafts 10A, 10A engaged with the nuts 10B, 10B are turned via a transmission mechanism mounted on the base 2 by an external drive unit disposed at a specified position of the transfer path, the lifting and lowering support bodies 5, 6, the lateral bridging member 7, the turn table 8, and the hanger 9 and the vehicle body A can be lifted to a desired height, so that the vehicle body A can be lifted and lowered to a height suitable for the operation of mounting parts on the vehicle body A.

Next, the operation of turning the turn table 8 will be described. As shown in FIG. 5 and FIG. 6, in a state where the vehicle body A is placed on the receiving parts 9B, 9B of the hanger 9, the weight of the turning part 8B of the turn table 8, the hanger 9, and the vehicle body A is supported by the fixed part 8A of the turn table 8 via the bearing, the support bars 7A, 7A, the lateral bridging member 7, the lifting and lowering support bodies 5, 6, the guide posts 3, 4, and the base 2, and the vehicle body A is still in this state.

The turn table 8 has a turning part 8B turned around the vertical axis 8C with respect to the fixed part 8A as described above, and when the operator pushes, for example, one of the right and left depending parts of the hanger 9, the operator can easily turn the hanger 9, the vehicle body A, and the turning part 8B around the vertical axis 8C.

Moreover, the turn table 8 can be easily turned not only by the manual operation like this but also by operating a cam link (not shown) coupled and fixed to the turning part 8B by an external guide rail (not shown) disposed at a specified position of the transfer path.

Thus, as shown in FIG. 5 and FIG. 6, the vehicle body A can be turned at a suitable position of the transfer path and can be easily directed to a direction orthogonal to the transfer direction as shown in FIG. 5B and FIG. 6B in accordance with the direction in which the transfer unit (not shown) is extended and contracted. Hence, the vehicle body A can be easily delivered to the transfer unit (not shown) from this state. Conversely, the vehicle body A can be easily received from the transfer unit on the receiving parts 9B, 9B of the hanger 9.

Further, the vehicle body A can be turned with respect to the base 2 by the turn table 8, so that the vehicle body A can be turned irrespective of position relation to the other transfer car 1, that is, even in a state where the vehicle body A is adjacent to the other transfer car 1 on the front or rear side thereof.

Hence, the vehicle body A can be turned according to the contents of the operation at an arbitrary position of the transfer path (operational process) so as to facilitate the operation of the operator operating on the base 2 or to eliminate the useless action of the operator, so that workability can be improved.

Further, when the vehicle body A is delivered to or received from the transfer unit, the vehicle body A can be turned in accordance with the direction in which the transfer unit is extended and contracted, so that the operation of delivering or receiving the vehicle body A can be easily performed. Moreover, the vehicle body A can be also turned in accordance with a sub-conveyor for transferring the parts, so that the degree of flexibility in constructing the line can be enhanced.

Still further, as described above, the operation of lifting and lowering the vehicle body A is performed by the external drive unit and the operation of turning the vehicle body A is performed by the manual operation or by operating the cam link coupled and fixed to the turning part 8B of the turn table 8 by the external guide rail disposed at the specified position of the transfer path. Thus, the transfer car 1 is not mounted with an actuator such as a motor or an air cylinder and hence a traveling transfer car 1 does not need to be supplied with power. Hence, the transfer car 1 and the automobile assembly line using the transfer cars 1 can be made simple.

Still further, when the automobile assembly line is constructed by using plural transfer cars 1, . . . in common in the respective processes and transfer cars 1 are transferred in the respective processes by at least either of the automated guided vehicle D (see FIG. 5 and FIG. 6) that sinks under the base 2 and tows the transfer car 1, or the friction roller type drive unit that presses the friction rollers onto the side surfaces 2B, 2C of the base 2 to provide the propelling force and the transfer cars 1 are transferred between the respective processes by the sinking type automated guided vehicle D, the automobile assembly line is constructed of the transfer cars 1 . . . used in common and the overhead conveyor hung from the house is not installed, so that installation cost and construction cost can be reduced.

In addition, since the transfer cars 1, . . . are used in common in the automobile assembly line, cost can be reduced and construction time can be shortened.

In more addition, the plural transfer cars 1, . . . are used in common, and the transfer cars 1 are transferred in the respective processes by at least either of the sinking type automated guided vehicle D or the friction roller type drive unit, and the transfer cars 1 are transferred between the respective processes by the sinking type automated guided vehicle D. Thus, when the respective lines are connected in series like a line to construct the automobile assembly line, the necessary transfer units can be reduced in number. Hence, since the transfer units can be reduced in number, the availability of the line can be enhanced and the number of vehicle bodies in process can be reduced.

In further more addition, since the transfer cars 1 are transferred by only the sinking type automated guided vehicle D or by a combined use of the sinking type automated guided vehicle D and the friction roller type drive unit, chains and the like do not need to be installed under the transfer cars 1 and hence the level of a floor can be lowered. Hence, it is possible to construct an automobile assembly line that is simple, effective, and excellent in workability because the operator can easily ride on and off the floor owing to the low floor.

What is claimed is:

1. A transfer car having a lifting and lowering function and a turning function, the transfer car comprising:
    a pair of guide posts erected on a front right end portion and a rear left end portion, or on a front left end portion and a rear right end portion of a base formed nearly in a rectangular shape when viewed in a plan;
    a pair of lifting and lowering support bodies supported by these guide posts and lifted and lowered;
    a lateral bridging member laterally bridging the pair of lifting and lowering support bodies;
    a turn table mounted on a lower side in a center in a longitudinal direction of the lateral bridging member and having a turning part turned around a vertical axis with respect to a fixed part; and
    a hanger having a top end portion coupled to the turning part of the turn table and hanging a vehicle body placed on a receiving part mounted on a bottom end portion.

2. The transfer car having a lifting and lowering function and a turning function according to claim 1,
    wherein each of the pair of lifting and lowering support bodies is coupled and fixed to a nut of a ball screw and is lifted and lowered by turning a ball screw shaft engaged with the nut via a transmission mechanism mounted on the base by an external drive unit mounted at a specified position of a transfer path to lift and lower the lateral bridging member, the turn table, and the hanger, and
    wherein the turn table is turned by a manual operation or by operating a cam link coupled and fixed to the turning part by an external guide rail mounted at a specified position of the transfer path.

3. An automobile assembly line using the transfer car having a lifting and lowering function and a turning function according to claim 2 in common in respective processes,
    wherein the transfer car is transferred in the respective processes by at least either of an automated guided vehicle that sinks under the base and tows the transfer car, or a friction roller type drive unit that presses a friction roller onto a side surface of the base to apply a propelling force, and
    wherein the transfer car is transferred between the respective processes by the automated guided vehicle.

4. An automobile assembly line using the transfer car having a lifting and lowering function and a turning function according to claim 1 in common in respective processes,
    wherein the transfer car is transferred in the respective processes by at least either of an automated guided vehicle that sinks under the base and tows the transfer car, or a friction roller type drive unit that presses a friction roller onto a side surface of the base to apply a propelling force, and
    wherein the transfer car is transferred between the respective processes by the automated guided vehicle.

* * * * *